July 25, 1933.   C. R. A. M. DE ROUGE   1,919,831
STABILIZING DEVICE FOR AIRCRAFT
Filed Feb. 19, 1931
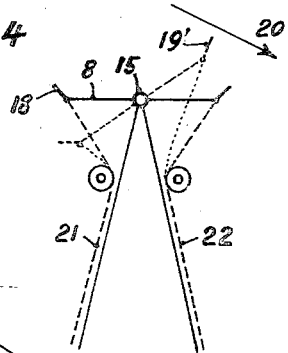
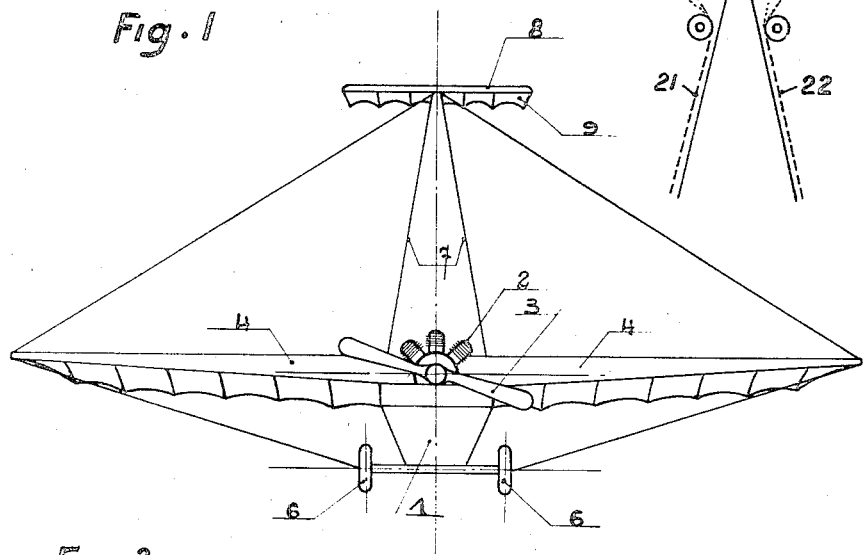
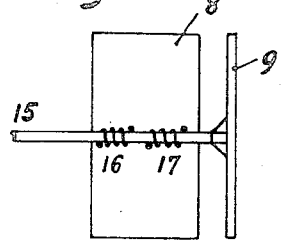
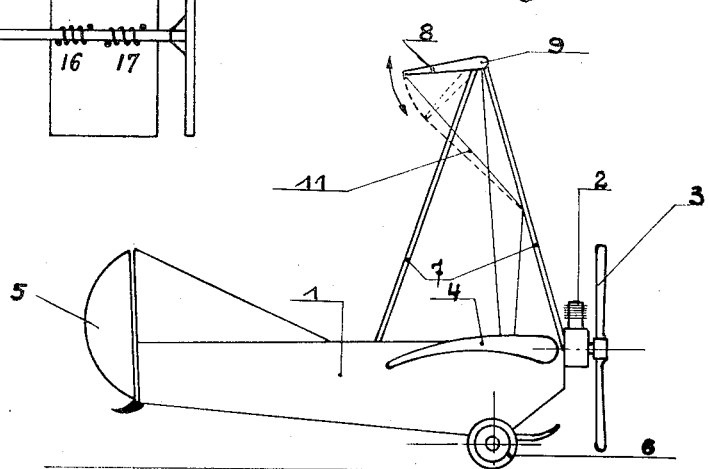

Patented July 25, 1933

1,919,831

UNITED STATES PATENT OFFICE

CHARLES ROGER ANNE MARIE DE ROUGÉ, OF VOUYSSES PAR MERCUES, FRANCE

STABILIZING DEVICE FOR AIRCRAFT

Application filed February 19, 1931, Serial No. 517,083, and in France February 24, 1930.

The object of my invention is a stabilizing device allowing the easy adjustment and modification of the inclination of an aircraft through the creation, at the required moment, of a resistance against progress the magnitude of which varies as desired by the pilot, the point of impact of this resistance being at a comparatively considerable height above the aircraft, whereby the torque, due to this resistance and measured with reference to the transversal axis of the aircraft, may become very large.

The following description and accompanying drawing show by way of example a form of execution of my invention as applied to an aeroplane. Obviously, my invention may be as well applied to all aircrafts, air-balloons, airships, helicopters, etc.

Figure 1 is a front view of an aircraft provided with my improved stabilizing device.

Figure 2 is a side-view thereof.

Figures 3 and 4 are detail views of the stabilizing means.

The aeroplane C comprises as usual a body 1 carrying a motor 2 driving a propeller 3, two wings 4, a rudder 5 and a set of landing wheels 6. To the body of the aeroplane, is secured a support 7 comprising for instance stayed uprights carrying a plane 8 adapted to rotate through a certain angle round a horizontal axis 9 perpendicular to the longitudinal axis of the aeroplane. A cable 11 secured to the movable edge of this plane connects the latter with the body of the aeroplane after passing over a pulley if required. This cable affords means for an adjustable inclination of the plane 8 which is allowed, for instance, to enter the position shown in dotted lines.

It is easy to understand that, in this latter position, the plane opposes a certain resistance against progress and causes the aeroplane to rear or rise through its fore end to a certain extent.

The effect produced by the plane depends of course on the torque of the resistance provided by the air with reference to the transverse axis of the aeroplane and this torque is all the greater when the plane 8 is higher with reference to the centers of gravity and of pressure of the aeroplane.

The size to be given to the plane and its height above the body of the aeroplane depends obviously on the size of the aeroplane. By way of example, it may be stated that this height may be equal to about twice the width of the wing 4 measured between the edge engaged by the impact of the air and the edge along which it escapes, and that satisfactory results have been obtained with a plane having a surface of two square meters for an aeroplane the carrying surface of which has an area of sixteen square meters.

The cable 11 may be actuated by the pilot through a special device or it may be connected with the lever controlling the stabilizing and directing planes or rudders.

The plane 8 is also of great interest in as much as it ensures a transversal stability: if the aeroplane were to become inclined transversally, the lateral travel performed by the plane is considerable, owing to the great distance separating it from the body 1; the frictional action of the air due to this lateral travel produces therefore an action opposing the rolling motion of the aeroplane.

In order to increase this transversal stabilizing action, I may allow also the plane 8 to rotate round a longitudinal axis 15 to which it is yieldingly secured in the plane of the transversal axis 9 through the agency of the springs 16—17 which allow its transversal rocking motion.

When the aeroplane slides laterally, the resistance of the air will urge the plane 8 into a plane in which it is perpendicular to the plane of sliding, whereby the resistance due to the plane 8 and consequently its transversal stabilizing action are increased.

In order to still further increase this stabilizing action, I may raise both sides of the plane 8 as shown at 18 and 19 (Figure 4). When the aeroplane slides sideways in the direction of the arrow 20, it will cause the plane 8 to rise, the edge 19 passing into the position 19′.

Lastly, it is of advantage to allow the pilot to control the transversal incline of the plane 8; to this end, there are provided two control cables 21—22 secured through one end to the plane 8 and through the other to control means within reach of the pilot.

What I claim is:—

1. Longitudinally and transversally stabilizing device for aircrafts, comprising only a vertical mast the height of which is at least twice the breadth of the wings, at the top of said mast a transverse shaft, a longitudinal shaft adapted to pivot round the transverse one, reversible means for controlling said rotation with a large play, a stabilizing plane the area of which is at least one eighth of the supporting surface of the aircraft and adapted to pivot round said longitudinal axis, reversible means for controlling said rotation, elastic means for restoring said plane in its mean position with reference to the shaft.

2. Longitudinally and transversally stabilizing device for aircrafts, comprising only a vertical mast the height of which is at least twice the breadth of the wings, at the top of said mass a transverse shaft, a longitudinal shaft adapted to pivot round the transverse one, reversible means for controlling said rotation with a large play, a stabilizing plane the area of which is at least one eighth of the supporting surface of the aircraft and adapted to pivot round said longitudinal axis, reversible means for controlling said rotation, elastic means for restoring said plane in its mean position with reference to the shaft, on the longitudinal edges of said plane, other planes inclined upwards.

3. Longitudinally stabilizing device for aircrafts comprising only a vertical mast, at the top of said mast a transverse shaft, a plane mounted on said shaft and able to rotate around it, the center of pressure of said plane in any position it might assume being far behind the shaft, the length of the mast being at least twice the breadth of the wings, the area of the stabilizing plane is at least one-eighth of the supporting surface of the aircraft, and reversible means for greatly varying the slope of the plane.

CHARLES ROGER ANNE MARIE de ROUGÉ.